(12) United States Patent
Heisswolf et al.

(10) Patent No.: US 9,411,747 B2
(45) Date of Patent: Aug. 9, 2016

(54) DYNAMIC SUBROUTINE STACK PROTECTION

(71) Applicants: Dirk Heisswolf, Munich (DE);
Stéphanie Legeleux, Munich (DE);
Andreas Ralph Pachl, Neubiberg (DE)

(72) Inventors: Dirk Heisswolf, Munich (DE);
Stéphanie Legeleux, Munich (DE);
Andreas Ralph Pachl, Neubiberg (DE)

(73) Assignee: Freescale Semiconductor, Inc., Austin, TX (US)

( * ) Notice: Subject to any disclaimer, the term of this patent is extended or adjusted under 35 U.S.C. 154(b) by 109 days.

(21) Appl. No.: 14/172,661

(22) Filed: Feb. 4, 2014

(65) Prior Publication Data

US 2015/0220453 A1 Aug. 6, 2015

(51) Int. Cl.
*G06F 21/00* (2013.01)
*G06F 12/14* (2006.01)
*G06F 21/52* (2013.01)

(52) U.S. Cl.
CPC ............ *G06F 12/14* (2013.01); *G06F 12/1441* (2013.01); *G06F 21/52* (2013.01); *G06F 2212/1052* (2013.01)

(58) Field of Classification Search
CPC .......................... G06F 12/14; G06F 2212/1052
See application file for complete search history.

(56) References Cited

U.S. PATENT DOCUMENTS

| | | | | |
|---|---|---|---|---|
| 4,084,224 A * | 4/1978 | Appell | ....................... | G06F 9/52 711/153 |
| 6,785,886 B1 * | 8/2004 | Lim | .................... | G06F 9/45533 711/202 |
| 7,752,459 B2 | 7/2010 | Cowan et al. | | |
| 8,209,523 B2 * | 6/2012 | Nordqvist | ........... | G06F 9/30032 710/74 |
| 9,075,621 B2 | 7/2015 | Schon et al. | | |
| 2006/0161739 A1 | 7/2006 | Genty et al. | | |
| 2008/0052468 A1 | 2/2008 | Speirs et al. | | |
| 2008/0071991 A1 * | 3/2008 | Shaw | ..................... | G06F 9/3005 711/132 |
| 2013/0013965 A1 | 1/2013 | Guillemin et al. | | |
| 2014/0156972 A1 | 6/2014 | Shanbhogue et al. | | |
| 2014/0283040 A1 * | 9/2014 | Wilkerson | ............... | G06F 21/52 726/22 |

OTHER PUBLICATIONS

Microchip Technology, Inc., "PIC18F8733 Family Data Sheet: 64/80-Pin, 1-Mbit, Enhanced Flash Microcontrollers with 10-Bit A/D and nano Watt Technology," Section 5.1.3.4, 2008 Microchip Technology, Inc.; downloaded from <<http://ww1.microchip.com/downloads/en/DeviceDoc/39646c.pdf>> on Feb. 5, 2014, 4 pages.
U.S. Appl. No. 14/172,638, filed Feb. 4, 2014, entitled "Dynamic Interrupt Stack Protection".
Non-Final Office Action mailed Apr. 8, 2016 for U.S. Appl. No. 14/172,638, 15 pages.

* cited by examiner

*Primary Examiner* — Mahruzur Rahman

(57) ABSTRACT

A protection unit of a subroutine stack accessible by a CPU controlled by one main software program, for storing and removing stack frame(s), the stack protection unit being coupleable to the stack and the CPU, comprising:
a processor coupled to a first and a second address register;
wherein, when a first stack frame is stored onto the stack and the execution of the main software program is suspended by the CPU due to the execution of a subroutine;
the processing unit is adapted to set one access rule based on the first and second address registers, preventing:
the ongoing subroutine, from accessing a hardware-protected region of the stack, comprising at least one stack frame associated with a return address from which the main software program resumes execution after termination of the execution of the subroutine.
A processor, a method and a computer program are also claimed.

10 Claims, 4 Drawing Sheets

FIG. 1
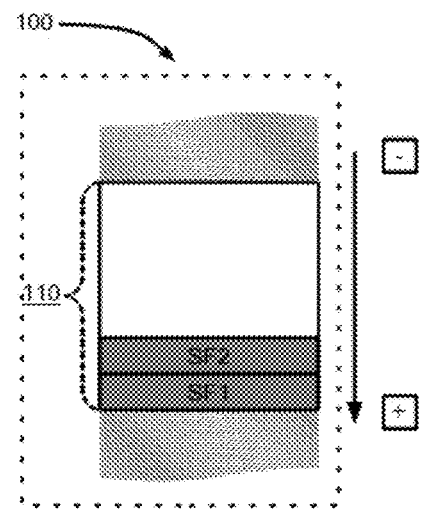
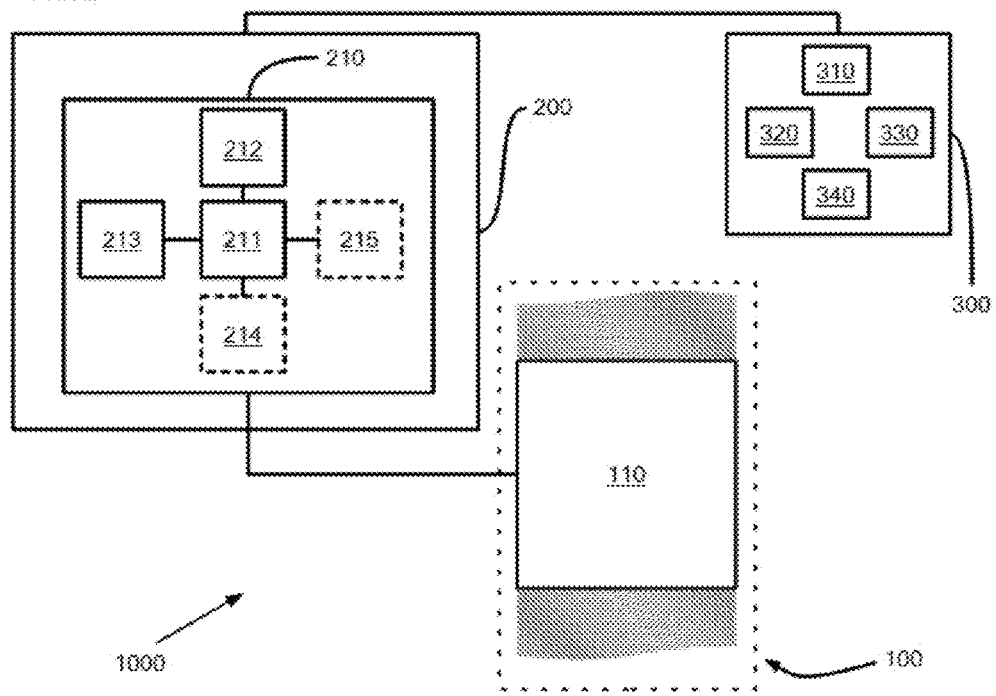

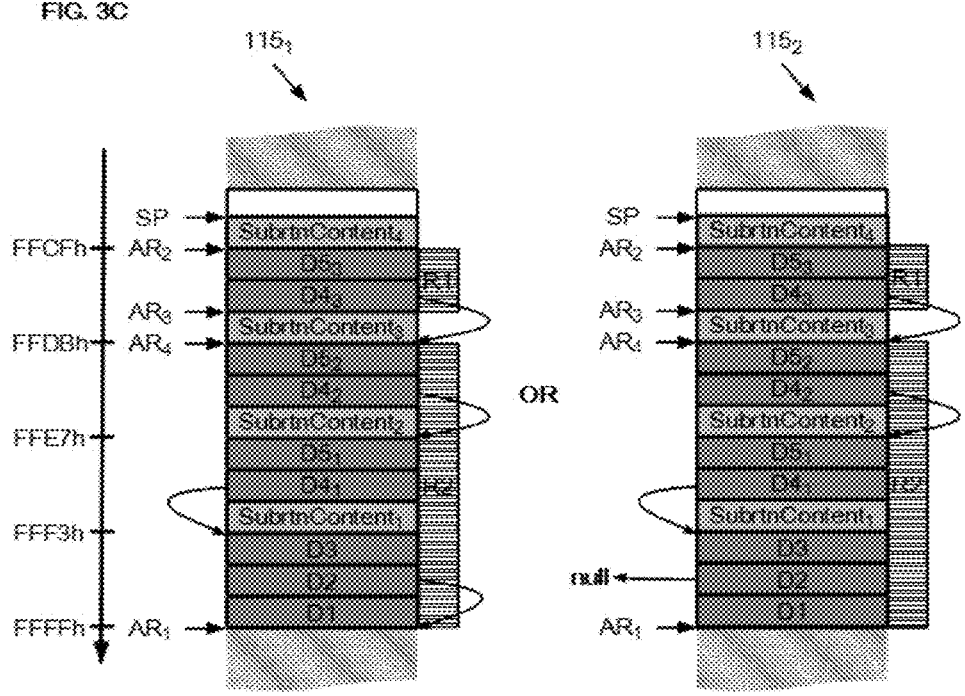

DYNAMIC SUBROUTINE STACK PROTECTION

CROSS-REFERENCE TO RELATED APPLICATION(S)

The present application is related to co-pending U.S. patent application Ser. No. 14/172,638, entitled "DYNAMIC INTERRUPT STACK PROTECTION," filed on Feb. 4, 2014, the entirety of which is herein incorporated by reference.

FIELD OF THE INVENTION

This invention relates to a subroutine stack protection unit, a processor, a method and a computer program for protecting a subroutine stack.

BACKGROUND OF THE INVENTION

Subroutines provide a way to perform a particular function at any point in a software program without duplicating the code which implements the function. Whenever a subroutine is called, the current location in the calling program flow is preserved and the subroutine is executed. After the completion of the subroutine, the calling program is resumed at the location where it left off. A calling program is able to pass parameters to a subroutine and retrieve return values upon completion. Subroutines are typically implemented with the help of subroutine stacks. These stacks are Last-In-First-Out memory buffers which serve to store call parameters, return values, the return address of the calling software program, as well as local variables. Subroutine stacks are vulnerable to many security and safety problems. Security problems typically manifest themselves in external attacks, such as stack buffer overflow attacks, where the attacker intentionally manipulates the saved return address of the subroutine to gain control over the computing system as the subroutine terminates execution and returns control to the software program. Safety problems are unintended stack manipulation caused by software or hardware faults. These stack manipulations may have severe impact on the system integrity. In particular these stack manipulations provide a way for immature code segments to affect the functionality of mature code segments. While there are existing protection schemes against the mentioned security problems (e.g., software solutions using the insertion of canary codes), these only offer limited stack protection. Most computing systems don't provide any protection against the safety issues. Common protecting mechanisms like memory protection units (MPU) provide access restrictions on static memory ranges and are not suited for the dynamic boundaries required for the protection of subroutine stacks.

Therefore, in view of the lack of appropriate protection techniques, there is a need to provide for the dynamic protection of subroutine stacks.

For instance, the stack is often used by a main program to dynamically store parameters in the provided space, for use by subroutine(s) of the main program. Such stacks are called subroutine stacks. Therefore, in view of the lack of appropriate protection techniques, there is a need to provide for the dynamic protection of subroutine stacks.

SUMMARY OF THE INVENTION

The present invention provides a subroutine stack protection unit, a processor, a method and a computer program for protecting a subroutine stack, as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 is a schematic diagram of a subroutine stack.

FIG. 2 is a schematic diagram of a computer system according to embodiments of the subject application.

FIGS. 3A-3C are schematic diagrams of the subroutine stack of FIG. 1 according to embodiments of the subject application.

DETAILED DESCRIPTION OF THE PREFERRED EMBODIMENTS

Figure 3A:
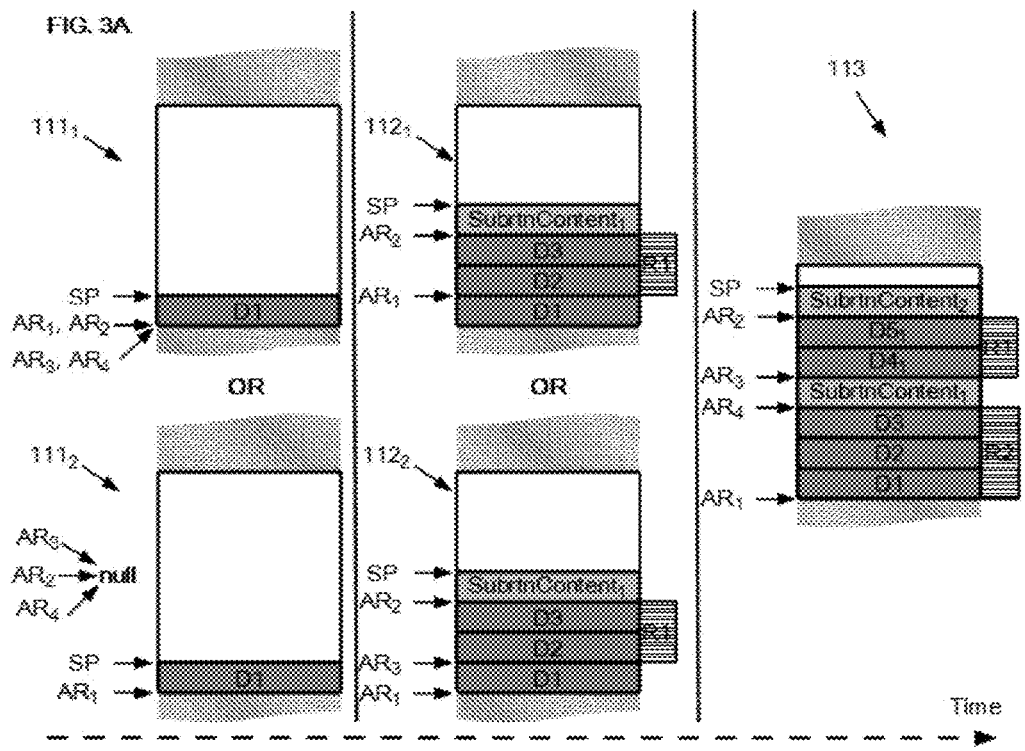

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

However, for the sake of clarity, basic knowledge related to subroutine stacks will be reviewed. First of all, suffice to say that a subroutine stack is a section of a Random Access Memory (RAM) that is structured as a LIFO (Last In-First Out) buffer and which is reserved notably for storage of parameters that are passed by a main program to a subroutine. A subroutine refers to a software program which when its execution has terminated returns control to a main software program that called it. In general, subroutines are mainly called for a single purpose. In fact, when the same function is required more than once within a main software program, that function is frequently coded as a subroutine, that is, a subprogram that can be used any number of times by the main software program. A Subroutine usually requires call parameters and may produce return values. Such parameters are provided by the calling program, which called the subroutine, through the subroutine stack. Additionally, when a subroutine is called, the address of the next instruction of the main program, following the termination of execution of the subroutine call and which is named the "return address", is also stored on the subroutine stack. Therefore, when the subroutine is executed, it must not manipulate the return address and the local variables of the calling program. Indeed, when the execution of the subroutine is completed, the return address is retrieved from the subroutine stack and the main program is resumed at an instruction indicated by the return address. It is important to note that a subroutine can be called in chain during the execution of another subroutine, i.e., a subroutine that is in execution can call another subroutine, which in turn can call another routine, which in turn can call another routine, and so on. Therefore the subroutine stack size grows and shrinks depending on how many subroutines are being executed at any time.

Referring to FIG. 1, there is diagrammatically shown therein a Random Access Memory (RAM) 100 comprising a subroutine stack 110. The exemplary subroutine stack 110 of FIG. 1 is having memory addresses extending between a lowest address (−), referred to as "overflow boundary" or "stack top" and a highest address (+), referred to as "underflow boundary" or "stack bottom". However, it is also common to have subroutine stacks being represented the other way around i.e., overflow boundary located at the highest address and the underflow boundary located at the lowest address of the stack. A space on the subroutine stack 110 provided to hold local variables and/or the return address is called a stack frame. In the example of FIG. 1, there are two stack frames SF1 and SF2. The principle of LIFO buffer used in the subroutine stack 110 can be visualized as a stack of papers wherein the last item placed onto the stack will be the first item taken off of it. The process of adding something onto the subroutine stack 110 is referred to as "pushing" it onto the stack while the process of removing an item from the stack is referred to as "pulling" it off. Consequently, in FIG. 1, it should be understood that SF1 has been pushed onto the subroutine stack 110 before SF2. Also, if a stack frame was to be pulled off the subroutine stack 110, SF2 would be pulled off before SF1.

The boundary addresses of a stack frame such as stack frame SF1 or stack frame SF2 will be denoted as bottom address and top address thereof. In case of a stack having an overflow boundary located at the lowest address and the underflow boundary located as the highest address, the bottom address of a stack frame refers to the highest address thereof and the top address of a stack frame refers to the lowest address thereof. In case of a stack having an overflow boundary located at the highest address and the underflow boundary located as the lowest address, the bottom address of a stack frame refers to the lowest address thereof and the top address of a stack frame refers to the highest address thereof. FIG. 1 and the following embodiments are described with reference to a stack having memory addresses extending between a lowest address (−) referred to as "overflow boundary" and a highest address (+) referred to as "underflow boundary". Those skilled in the art will understand that the invention will be likewise applicable to a stack with an overflow boundary located at the highest address and the underflow boundary located at the lowest address.

Referring now to FIG. 2, there is diagrammatically shown therein a computer system 1000 comprising:
 the RAM 100 of FIG. 1,
 a central processing unit of the computer system 1000 such as a central processor (CPU) 200 operably coupled to the subroutine stack 110, and,
 a main software program 300 operably coupled to the CPU 200.

In example of embodiments, the Random-Access Memory (RAM) 100 is configured to hold the subroutine stack 110. The exemplary CPU 200 is a program controlled semiconductor device which fetched, decodes and executes instructions. Such instructions may be provided by the main software program 300. The main software program 300 may be stored in a Read Only Memory (ROM) or also a Random Access Memory (RAM). In the example of FIG. 2, the main software program 300 comprises a first subroutine 310, a second subroutine 320, a third subroutine 330 and a fourth subroutine 340. Each of the first, second, third and fourth subroutine 310, 320, 330, 340 and 340 may be called by the main software program 300 or by the other subroutines. The CPU 200 of FIG. 2 comprises a subroutine stack protection unit 210 adapted to prevent unauthorised access to at least part of the subroutine stack 110. Indeed, when the main software program 300 is executed by the CPU 200, a subroutine 310, 320, 330, 340 may be called and may suspend the execution of the current task of the main software program 300. The suspension of the task is followed by the CPU 200 transferring control to the called subroutine. However, during the execution of a subroutine, additional subroutine(s) may be called by the currently executing subroutine. Consequently, at given moment in time the CPU 200 may execute nested subroutines 310, 320, 330, 340 and the subroutine stack 110 may comprise several stack frames associated with the nested subroutines arranged on top of each other. It is well known that individual subroutines can execute code with varying levels of safety levels. To avoid a degrading of secure subroutines due to the fact that they may be compromised by subroutines of lower security rating, these subroutines must be isolated from each other. For static memory ranges, this can be accomplished with the help of a memory protection unit (MPU) or a memory management unit (MMU). However subroutine stacks are typically shared by these subroutines without any form of hardware protection. For instance, a subroutine programmed for verifying security credentials and another subroutine programmed for checking whether an input address is within a given range of addresses may have been implemented according to different security levels. Indeed, each subroutine in the subroutine stack may manipulate local variables and return addresses stored therein. Therefore in such situation, one would not want the different subroutines to influence on each other or to interact with each other except with the main software program 300 or the subroutine which called the current subroutine. In other words, in such situation, one would only want each subroutine to access the stack frame(s) allocated to its execution and the execution of the calling program (e.g., the main software program 300 or another subroutine) and not the other stack frame(s) allocated to the other subroutines. Thereby, the proposed subroutine stack protection unit 210 of the subject application aims at achieving such effect.

Referring back to FIG. 2, the subroutine stack protection unit 210 is operably coupled to the subroutine stack 110 though the CPU 200 comprises:
 a processing unit such as a processor 211, and
 a first, a second, a third and a fourth address register 212, 213, 214, 215.

In examples of implementations, the first, second, third and fourth registers 212, 213, 214, 215 are storage elements, operably coupled to the processor 211. Further, each of the first, second, third and fourth registers 212, 213, 214, 215 is adapted to store an address within the range of the subroutine stack 110. Additionally, the first, second, third and fourth registers 212, 213, 214, 215 may not be accessible by any code in execution and/or any software such as the main software program 300 and the subroutines 310, 320, 330, 340. In an embodiment, the first address register 212 is a constant value. Indeed, as it will be later shown, in certain embodiment, the value stored in the first address register is not meant to be changed through the overall process disclosed in the subject application. The exemplary processor 211 is a program controlled semiconductor device which fetched, decodes and executes instructions. In the following, the processor 211 is adapted to push stack frame(s) onto the subroutine stack 110, pull stack frame(s) from the subroutine stack 110. Also, as the processor 211 is operably coupled to the first, second, third and fourth registers 212, 213, 214, 215, it is also adapted to access and manipulate their content.

Figure 3B:
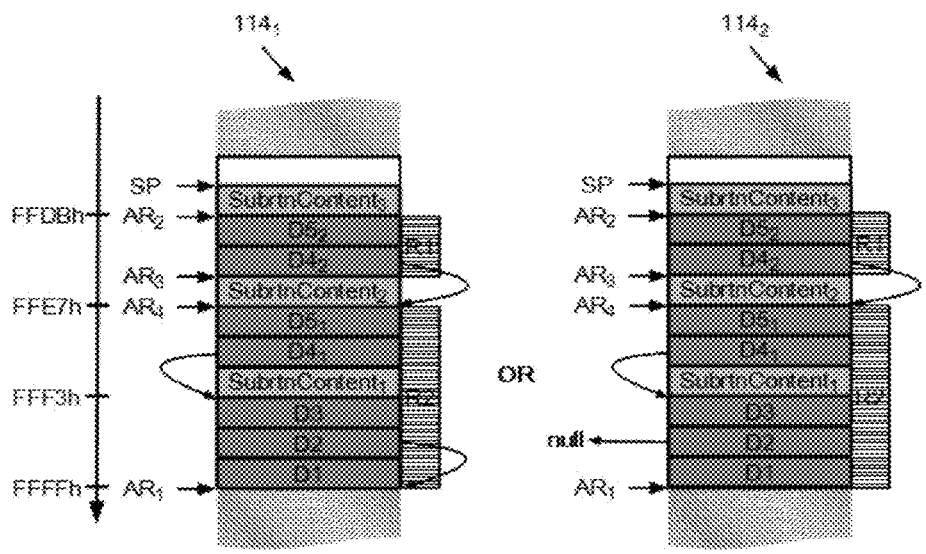
Figure 4:
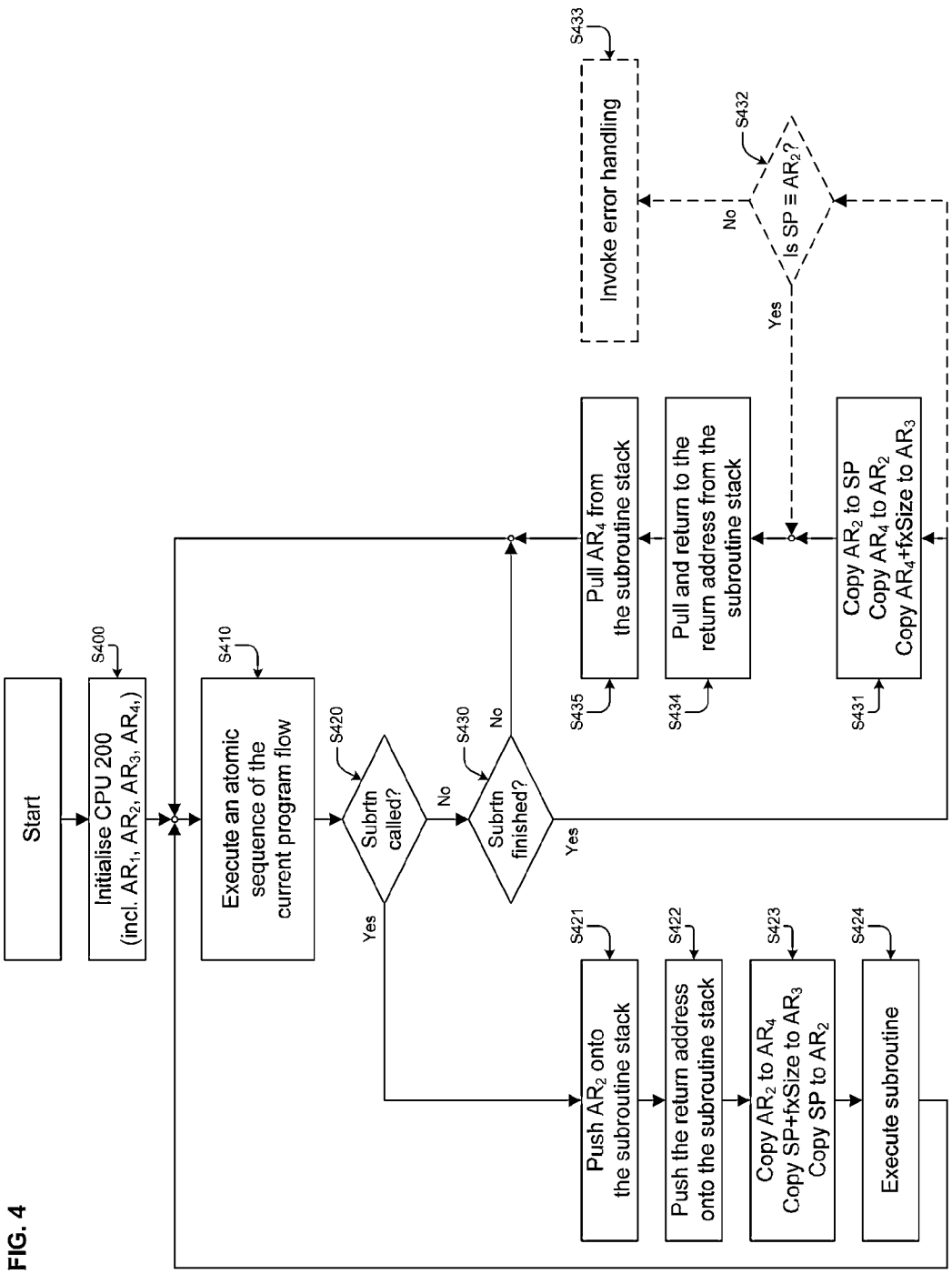
FIG. 4 is a schematic flow diagram of a method of preventing unauthorised access to the subroutine stack of FIG. 1 according to an embodiment of the subject application.

Hereinafter, FIGS. 3A-3C along with FIG. 4 will be described altogether. In FIGS. 3A-3C there is diagrammatically shown therein schematic diagrams of the subroutine stack 110 according to embodiments of the subject application. Referring to FIG. 4, there is diagrammatically shown therein a schematic flow diagram of a method of preventing unauthorised access to the subroutine stack 110 according to an embodiment of the subject application.

In the examples of FIGS. 3A-3C the first address register 212 is identified as $AR_1$, the second address register 213 is identified as $AR_2$, the third address register 214 is identified as $AR_3$ and the fourth address register 215 is identified as $AR_4$. Also, there is represented in FIGS. 3A-3C, a stack pointer register, identified as SP, which is an address register associated with the CPU 200 and which automatically points to the top of the subroutine stack 110 (i.e. the most recent stack entry) as it grows and shrinks in size. Further, throughout the present application, it will be assumed that the stack pointer SP grows up towards the overflow boundary of the subroutine stack 110 and shrinks towards the underflow boundary (i.e. the bottom) of the subroutine stack 110. Consequently, the stack pointer SP is always pointing to the most recent entry of the subroutine stack 110 where a stack frame has been pushed. However, in other implementations of the subroutine stack 110, the stack pointer SP may be pointing at the next free memory location of the where a stack frame can be pushed.

Referring now to FIG. 4, in S400 the CPU 200 is reset and initialized for the execution of the software program 300. Additionally $AR_1$ 212, $AR_2$ 213, $AR_3$ 214 and $AR_4$ 215 are initialized as well.

In an embodiment illustrated in FIG. 3A $111_1$, $AR_1$ 212, $AR_2$ 213, $AR_3$ 214 and $AR_4$ 215 are initialized to the highest address associated with the first stack frame D1 (i.e. the bottom of the subroutine stack 110). It is to be noted that the proposed solution is adapted to work without the first stack frame D1 being stored on the subroutine stack 110. For example, if the bottom address of the subroutine stack 110 is set to the address FFFFh in hexadecimal notation then in accordance with the embodiment of FIG. 3A $111_1$, the following pseudocode could represent the initialization of $AR_1$ 212, $AR_2$ 213, $AR_3$ 214 and $AR_4$ 215:

$AR_1$=FFFFh,
$AR_2$=FFFFh,
$AR_3$=FFFFh, and
$AR_4$=FFFFh.

In another embodiment illustrated in FIG. 3A $111_2$, $AR_1$ 212 is initialized to the highest address associated with the stack frame D1 while $AR_2$ 213, $AR_3$ 214 and $AR_4$ 215 are initialized to a null address. The null address is an address which by convention points to an address made only of 0s (e.g. 0000h in hexadecimal notation). However, any purposive address value outside the address range of the subroutine stack 110 can serve as a null pointer value. For example, if the bottom address of the subroutine stack 110 is set to FFFFh then in accordance with the embodiment of FIG. 3A $111_2$, the following pseudocode could represent the initialization of $AR_1$ 212, $AR_2$ 213, $AR_3$ 214 and $AR_4$ 215:

$AR_1$=FFFFh,
$AR_2$=0000h,
$AR_3$=0000h, and
$AR_4$=0000h.

In S410, once CPU 200, $AR_1$ 212, $AR_2$ 213, $AR_3$ 214 and $AR_4$ 215 have been initialized, the CPU 200 executes one atomic sequence of the main software program 300. Once the execution has been completed, it is checked whether a subroutine is to be called (S420) or whether an ongoing subroutine has been completed (S430). If neither one of the case is experienced, a further portion of the software program 300 is to be executed (S410). In the example FIG. 3A 111, the execution of the software program 300 may cause a stack frame D1 to be allocated on the subroutine stack 110. The stack frame D1 may comprise for example local variables that can be manipulated by the software program 300 during execution. Nevertheless, it is important to note that the software program 300 may not need any associated stack frame on the subroutine stack 110 while being in operation. Therefore, a subroutine may be executed whether there is or not a stack frame on the subroutine stack 110.

As said earlier, a called subroutine is able to intermit the ongoing flow of the software program 300 or another subroutine in case or nested subroutines in order to execute its set of code. As the subroutine is called by the main software program 300, it is to be understood that the occurrence of subroutine is mostly synchronous with reference to the flow of the main software program 300. Hence, for instance, a software interrupt service request (IRQ) triggered by the main software program 300 may also be considered as being a subroutine, particularly when parameters are passed to the software IRQ.

Referring now to FIG. 3A 112, it is shown therein the state of the subroutine stack 110 before a subroutine such as the first subroutine 310 is executed by the CPU 200. In FIG. 3A $112_1$, when the first subroutine 310 is about to be executed, the content of the second address register 212 which is illustrated as the stack frame D2, is pushed onto the subroutine stack 110 (S421). Also, the return address associated with the termination of execution of the first subroutine 310 and which is illustrated as the stack frame D3 is pushed onto the subroutine stack 110 (S422). It is to be noted that in one embodiment, the stacking order of entries of D2 and D3 may be organised the other way around or even be interleaved. As said earlier, the return address is the address of execution immediately following the termination of execution of the called subroutine. Thus saving the return address will make it possible to return from a called subroutine to the correct instruction in the calling software program (e.g., the main program 300), that correct instruction having been defined at the time the calling software program was suspended to execute the called subroutine. In the example of FIG. 3A $112_1$, the first address register 212 stores the highest address associated with the stack frame D2 and the second address register 213 stores the lowest address associated with the stack frame D3 (S423). In accordance with the embodiment of FIG. 3A $112_1$, the following pseudocode could represent the setting of $AR_1$ 212 and $AR_2$ 213 during the stacking of the subroutine stack 110:

$AR_1$=HighAddr(D2), and
$AR_2$=LowAddr(D3)

wherein:
HighAddr(•) is a function configured to return the highest address associated with a stack frame or a stack range provided as a parameter, and
LowAddr(•) is a function configured to return the lowest address associated with a stack frame or a stack range provided as a parameter.

In an implementation of HighAddr(•) and LowAddr(•), the following pseudocode could represent the setting of $AR_1$ 212 and $AR_2$ 213:

$AR_1$=SP+fxSize, and
$AR_2$=SP.

Indeed, every time a stack frame is pushed onto or pulled off the subroutine stack 110, SP is automatically updated and its value can be used to set the content of the address registers at given moment in time. For instance, when D2 and D3 are pushed onto the subroutine stack 110, SP is automatically set to the top of the stack. Therefore, if it is assumed that the size of the D2 and D3 is fixed to the value fxSize, then it is possible to retrieve the value of SP and use it to determine the address to be assigned to $AR_1$. Also, when D3 is pushed onto the subroutine stack 110, SP is automatically set to the top of the stack. Therefore, at this moment and before a further stack frame such as $SubrtnContent_1$ in FIG. 3A 112$_1$ is pushed onto the subroutine stack 110, it is possible to retrieve the value of SP and assign it to $AR_2$.

In another example illustrated in FIG. 3A 112$_2$, it is made use of the third address register 214 while the first address register 212 is not modified compared to FIG. 3A 111. Indeed, in FIG. 3A 112$_2$ the second address register 213 stores the lowest address associated with the stack frame D3 and the third register 214 stores the highest address associated with the stack frame D2. In accordance with the embodiment of FIG. 3A 112$_2$, the following pseudocode could represent the setting of $AR_2$ 213 and $AR_3$ 214 during the stacking of the subroutine stack 110:

$AR_2$=LowAddr(D3), and
$AR_3$=HighAddr(D2)

wherein HighAddr(•) and LowAddr(•) are function as already described.

In an implementation of HighAddr(•) and LowAddr(•), the following pseudocode could represent the setting of $AR_2$ 213 and $AR_3$ 214:

$AR_2$=SP, and
$AR_3$=SP+fxSize.

Indeed, when D2 and D3 are pushed onto the subroutine stack 110, SP is automatically set to the top of the stack. Therefore, if it assumed that the size of the D2 and D3 is fixed to the value fxSize, then it is possible to retrieve the value of SP and use it to determine the address to be assigned to $AR_3$. Also, when D3 is pushed onto the subroutine stack 110, SP is automatically set to the top of the stack. Therefore, at this moment and before a further stack frame such as $SubrtnContent_1$ in FIG. 3A 112$_2$ is pushed onto the subroutine stack 110, it is possible to retrieve the value of SP and assign it to $AR_2$.

In both FIG. 3A 112$_1$ and FIG. 3A 112$_2$ the first subroutine 310 associated with the stack frame $SubrtnContent_1$ is prevented from accessing a first hardware-protected region of the subroutine stack 110 illustrated in FIG. 3A 112 as R1.

In one embodiment and referring to FIG. 3A 112$_1$ the first hardware-protected region R1 extends between addresses of the subroutine stack 110 stored in the first address register 212 and the address of the stack stored in the second address register 213. As the first and second address registers 212, 213 are not accessible through software, their content may not be altered and the integrity of the first hardware-protected region R1 is preserved from software malicious attacks. In accordance with the embodiment of FIG. 3A 112$_1$, the following pseudocodes could represent the setting of the first hardware-protected region R1 in a locked position:

Stack.LockRegion($AR_1$, $AR_2$)
Stack.LockRegion($AR_2$, $AR_2$+fxSize), wherein LockRegion(•) is a function configured to lock a given region of a stack, the region extending between the content of at least two addresses of the subroutine stack 110 provided as a parameters. The protection of the first hardware-protected region R1 may be performed by setting at least one access rule indicative of appropriate access rights such as read, write and/or execute.

This way the first hardware-protected region R1 may be protected form reading, writing and/or execution. Hence, as the first hardware-protected region R1 may be non-executable, an injected malicious code could not be executed. For the one of ordinary skills in the art of computer systems, such hardware protection may be enforced using similar techniques as used in current MPUs (Memory Protection Units).

In another embodiment and referring to FIG. 3A 112$_2$ the first hardware-protected region R1 extends between addresses of the subroutine stack 110 stored in the second address register 213 and the address of the stack stored in the third address register 214. As the second and third address registers 213, 214 are not accessible through software, their content may not be altered and the integrity of the first hardware-protected region R1 is preserved from software malicious attacks. It is to be noted that in the embodiment of FIG. 3.3A 112$_2$, the first address register 212 is not modified in this embodiment. Also, in accordance with the embodiment of FIG. 3A 112$_2$, the following pseudocode could represent the setting of the first hardware-protected region R1 in a locked position:

Stack.LockRegion($AR_2$, $AR_3$)

wherein LockRegion(•) is a function as already described.

In FIG. 3A 112, once the first hardware-protected region R1 has been protected, the execution of the first subroutine 310 begins (S424) and a stack frame associated with the first subroutine 310 may be pushed onto the subroutine stack 110 if needed. For example in FIG. 3A 112 such a stack frame is illustrated as $SubrtnContent_1$.

In view of the above-described mechanism, it is now clear that when the main software program 300, executed by the CPU 200, is suspended by the execution of the first subroutine 310, the executing subroutine 310 is prevented from accessing part of the subroutine stack 110 which is not of interest for its execution. In other words, the execution of the first subroutine 310 which has suspended the execution of the main software program 300 can only access the memory space allocated for it and the memory space allocate to the main software program 300 which called it. Namely, in the example of FIG. 3A 112, the first subroutine 310 must not access the first hardware-protected region R1 but may access the stack frames D1 and $SubrtnContent_1$. Indeed, the first subroutine 310 may need to access the stack frame $SubrtnContent_1$ allocate to it, particularly if the first subroutine 310 needs to manipulate local variables stored therein. Additionally, the first subroutine 310 may also need to access the stack frame D1 associated to the main software program 300. Indeed, this access is required to enable the passing of parameters from the main software program 300 to the first subroutine 310 and to return a result from the first subroutine 310 to the main software program 300. For example, let's consider that within the main software program 300 there is a subroutine F1 having two parameters '$params_1$' and '$params_2$'. Hence when the subroutine F1 is called by the main software program 300 (e.g., F1($params_1$, $params_2$)) it is to be understood, with reference to FIG. 3A 112, that '$params_1$' and '$params_2$' are stored in stack frame D1. Therefore, it makes sense to also allow the first subroutine 310 to read the content the stack frame D1 and to store a return value within the stack frame D1. Others areas of the subroutine stack 110 may not be accessible by the first subroutine 310. Therefore, for instance, if the first subroutine 310 comprises malicious code, it may not access the return address stored in the stack frame D3, thus guarantying that once the first subroutine has terminated execution it will return to the correct instruction within the main software program 300 which could then resume execution.

Referring back to FIG. 4 during the execution of subroutine (S410), a new subroutine 320 may be executed by the current subroutine thus suspending the execution of the current subroutine (S420). In such case the new subroutine is executed immediately as a nested subroutine following steps S421 to S424. Indeed when a subroutine is being executed by the CPU 200, the flow of execution of the subroutine may be suspended by another subroutine called by a currently executing subroutine.

Starting from FIG. 3A $112_2$ and referring now to FIG. 3A 113, it is considered that the second subroutine 320 is called by the first subroutine 310. In operation, when the second subroutine 320 is called, the first subroutine 310 is suspended and the content of the second address register 213 which is illustrated as the stack frame $D4_1$, is pushed onto the subroutine stack 110. Also, the return address associated with the termination of execution of the second subroutine 320 which is illustrated as the stack frame $D5_1$, is pushed onto the subroutine stack 110. In the example of FIG. 3A 113:

the second address register 213 stores the lowest address associated with the stack frame $D5_1$, and, the third address register address 214 stores the highest address associated with the stack frame $D4_1$.

In accordance with the embodiment of FIG. 3A 113, the following pseudocode could represent the setting of $AR_2$ 213 and $AR_3$ 214 during the stacking of the subroutine stack 110:

$AR_2$=LowAddr($D5_1$), and $AR_3$=HighAddr($D4_1$).

In an implementation of LowAddr(•), the following pseudocode could represent the setting of $AR_2$ 213: $AR_2$=SP and $AR_3$=SP+fxSize at appropriate moment in time, as already explained earlier.

As the first hardware-protected region R1 is delimited by $AR_2$ and $AR_3$ it can be clearly seen while comparing FIG. 3A $112_2$ and FIG. 3A 113, that the first hardware-protected region R1 has not changed in size. However, as also can be clearly seen while comparing FIG. 3A 112 and FIG. 3A 113, the first hardware-protected region R1 has moved upwards. Hence, the second subroutine 320 is prevented from accessing the first hardware-protected region R1 of the subroutine stack 110 as already explained above. In accordance with the embodiment of FIG. 3A 113, the following pseudocodes could represent the setting of the first hardware-protected region R1 in a locked position: Stack.LockRegion($AR_2$, $AR_3$) or Stack.LockRegion($AR_2$, $AR_2$+fxSize). In addition to the first hardware-protected region R1, the second subroutine 320 may also be prevented from accessing a second hardware-protected region. In one embodiment and referring to FIG. 3A 113 the second hardware-protected region is illustrated as R2. Indeed, with only the first hardware-protected region R1, the second subroutine 320 may not access the return address to first subroutine 310 but may access the return address to the main software program 300 while the first subroutine 310 terminates execution. To prevent this, the second hardware-protected region R2 extends between addresses of the subroutine stack 110 stored in the first address register 212 and the address of the stack stored in the fourth address register 215. In an example, the fourth address register 215 may be initialized to the content of the second address register 213 such as $AR_4$=$AR_2$. As the first and fourth address registers 212, 215 are not accessible through software, their content may not be altered and the integrity of the second hardware-protected region R2 is preserved from software malicious attacks. In accordance with the embodiment of FIG. 3A 113, the following pseudocode could represent the setting of the second hardware-protected region R2 in a locked position: Stack.LockRegion($AR_1$, $AR_4$). Details related to the function Stack.LockRegion(•) have already been presented with regards to the first hardware-protected region R1. Further in FIG. 3A 113, once both the first hardware-protected region R1 has been adjusted in position and the second hardware-protected region R2 has been protected, a stack frame associated with the second subroutine 320 may be pushed onto the subroutine stack 110 if needed. For example in FIG. 3A 113 such a stack frame is illustrated as $SubrtnContent_2$.

The whole process can be repeated until all the triggered subroutines have been executed. For instance, referring to FIG. 3B 114, it is considered that the third subroutine 330 is called by the second subroutine 320 while being in execution. In operation, when the third subroutine 330 is called, the second subroutine 320 is suspended and the content of the second address register 212 which is illustrated as the stack frame $D4_2$, is pushed onto the subroutine stack 110. Also, the return address associated with the termination of execution of the third subroutine 330 which is illustrated as the stack frame $D5_2$, is pushed onto the subroutine stack 110. In the example of FIG. 3B 114:

the second address register 213 stores the lowest address associated with the stack frame $D5_2$, and, the third address register address 214 stores the highest address associated with the stack frame $D4_2$.

In accordance with the embodiment of FIG. 3B 114, the following pseudocode could represent the setting of $AR_2$ 213 and $AR_3$ 214 during the stacking of the subroutine stack 110:

$AR_2$=LowAddr($D5_2$), and $AR_3$=HighAddr($D4_2$).

In an implementation of LowAddr(•), the following pseudocode could represent the setting of $AR_2$ 213: $AR_2$=SP and $AR_3$=SP+fxSize at appropriate moment in time, as already explained earlier.

As the first hardware-protected region R1 is delimited by $AR_2$ and $AR_3$ it can be clearly seen while comparing FIG. 3A 113 and FIG. 3A 114, that the first hardware-protected region R1 has moved upwards as already explained. Additionally, as the second hardware-protected region R2 is delimited by $AR_1$ and $AR_4$ it can be clearly seen while comparing FIG. 3A 113 and FIG. 3A 114, that the second hardware-protected region R2 has grown in size. Further in FIG. 3B 114, once the first and second hardware-protected regions R1 and R2 have been adjusted, a stack frame associated with the third subroutine 330 may be pushed onto the subroutine stack 110 if needed. For example in FIG. 3B 114 such a stack frame is illustrated as $SubrtnContent_3$.

The whole process can be repeated until all the triggered subroutines have been executed. For instance, referring to FIG. 3B 115, it is considered that the fourth subroutine 340 is called by the third subroutine 330 while being in execution. Again, it is to be noted that while comparing FIG. 3B 114 and FIG. 3C 115, the first hardware-protected region R1 has moved upwards and the second hardware-protected region R2 has grown in size. Further in FIG. 3C 115, once the first and second hardware-protected regions R1 and R2 have been adjusted, a stack frame associated with the fourth subroutine 340 may be pushed onto the subroutine stack 110 if needed. For example in FIG. 3C 115 such a stack frame is illustrated as $SubrtnContent_4$.

As can be seen, the proposed mechanism provides for up to two hardware-protected regions R1 and R2 which are constantly adjusted to prevent the currently executed subroutine from accessing stack content associated with any of the currently interrupted subroutine apart from the stack content associated with the subroutine or the main software program 300 which executed the current subroutine. Also, as new nested subroutines are being executed the first hardware-protected region R1 is moved upwards and the second hardware-protected region R2 is extended such that the current subroutine can only access the memory space allocated for it and the memory space allocate to the main software program 300 or subroutine which called it.

Another advantage of the proposed solution is the generation of a particular list of addresses while the first and second hardware-protected regions R1, R2 are created. The generated list comprises elements being indicative of the lowest address associated with a stack frame associated with the return address of a subroutine (i.e. the stack frames illustrated as D2 and $D4_i$ in FIGS. 3A-3C: D2, $D4_1$, $D4_2$ and $D4_3$). This list allows the restoration of the previous state of the first and second hardware-protected regions R1 and R2 whenever the execution of one of the nested subroutine is complete. In the example FIG. 3C 115 with reference to FIG. 3A 111 and FIG. 3B 112, the last element of the list is either the null address or the highest address associated with the first stack frame D1. In order to exemplify the creation of the list, it will be assumed in FIG. 3C that the bottom address of the subroutine stack 110 is set to FFFFh and that the size of each stack frame is fixed to four bytes. Therefore, referring to FIG. 3C $115_1$ the list comprise the following elements: {FFDBh; FFE7h; FFF3h; FFFFh}. On the other hand, referring to FIG. 3C $115_2$ the list comprise the following elements: {FFDBh; FFE7h; FFF3h; null}. The list may be used as a Last In-First Out (LIFO) linked-list wherein the information contained therein may be used while the subroutine stack 110 is unstacked. Indeed, when the last called subroutine (e.g. the one being associated with the stack frame located on top of the subroutine stack 110) has finished its execution, it is possible to return to the proper return address in the previous subroutine that has been put on hold. This operation is normally performed automatically by the CPU 200. However the CPU 200 is not able to restore the first and second hardware-protected regions R1, R2 that exist when the previous subroutine was in execution. With the proposed solution and particularly the feature of the LIFO linked-list, it is possible to restore the previous first and second hardware-protected regions R1, R2 along with the return to the proper return address associated with the previous subroutine. For example, referring to FIG. 3C 115 when the execution of the fourth subroutine 340 has terminated, the following operations may be performed to revert to the proper state of the subroutine stack 110 (i.e. when the third subroutine 330 will be in execution):

- remove $SubrtnContent_4$ from the subroutine stack 110 (S431) or verify that $SubrtnContent_4$ has been properly removed from the subroutine stack 110 by the fourth subroutine 340 prior to its completion (S432). In the event where $SubrtnContent_4$ has not been removed from the subroutine stack 110 by the fourth subroutine 340 an error handling can be triggered (S433);
- load in the CPU 200 the proper return address of the third subroutine based on the content of the stack frame $D5_3$ and pull out $D5_3$ from the subroutine stack 110, bypassing any read access restriction imposed within the first hardware-protected region R1 (S434). However, in one embodiment where the stacking order of $D4_3$ and $D5_3$ is reversed, there is no need to bypass the protection for unstacking $D5_3$.
- store in the second address register 213 ($AR_2$) the content of the stack frame $D4_3$ or copy the content of 215 ($AR_4$) to 213 ($AR_2$) and pull out $D4_3$ from the subroutine stack 110;
- store in the third address register 214 ($AR_3$) the highest address associated with the stack frame $D4_2$. By restoring the content of second and third address registers 213, 214 ($AR_2$, $AR_3$), the previous state of the first hardware-protected region R1 will be restored as well;
- store in the fourth address register 215 ($AR_4$) the content of $D4_2$. In an example, it could also be stored in the fourth address register 215 ($AR_4$) the lowest address associated with stack frame $D5_1$. By restoring the content of fourth address registers 215 ($AR_4$), the previous state of the second hardware-protected region R2 will be restored as well;
- resume the execution of the third subroutine 330 at the return address loaded in the CPU 200.

In accordance with the embodiment of FIG. 3C 115, the bypassing of the access rule to the first and second hardware-protected regions R1, R2 can be performed temporarily by granting read access to the first and second hardware-protected region R1, R2. For instance, the following pseudocode could represent the setting of the first and second hardware-protected regions R1 and R2 in an unlocked position:

Stack.UnLockRegion(R1) and,
Stack.UnLockRegion(R2)

wherein UnLockRegion(•) is a function configured to unlock a given region of a stack, the region being provided as a parameter. After cleaning the subroutine stack 110 and returning to the proper return address, the first and second hardware-protected regions R1, R2 may be protected again as already described above. In the example of FIG. 3C $115_1$ when the subroutine stack 110 is unstacked, it is possible to determine the end of the LIFO linked-list by comparing each element with the content of the first address register 212. Indeed, the content of the first address register 212 is not changed during the whole process (e.g., in an example, it is always set to the address FFFFh) except for the case illustrated in FIG. 3A $112_1$ which can be easily adapted by adjusting the content of the first address register 212. Therefore, if while parsing the LIFO linked-list the current element is equal to the content of the first address register 212 then it can be deduced that the end of the LIFO linked-list has been reached and that the process of restoring the previous state of the first and second hardware-protection regions R1 and R2 should be stopped. In the example of FIG. 3C $115_2$ when the subroutine stack 110 is unstacked, it is possible to determine the end of the LIFO linked-list by comparing each element with the null address. Indeed, the second and third address register 213, 214 were originally initialized to the null address in FIG. 3A $111_2$ when there was no stack frame associated with a called subroutine on the subroutine stack 110. Therefore, if while parsing the LIFO linked-list the current element is equal to the null address then it can be deduced that the end of the LIFO linked-list has been reached and that the process of restoring the previous state of the first and second hardware-protection regions R1 and R2 should be stopped.

The skilled person would appreciate that the proposed solution provides a mechanism for preventing up to two non-contiguous regions R1, R2 of the subroutine stack 110 from being accessible by an ongoing subroutine. The one of ordinary skills in the art of computer systems will understand that the proposed solution of the subject application can be applied for instance to software based IRQs that need parameters passing with the main software program 300 or subroutine which launch them. Also based on the feature of the LIFO linked-list made of specific addresses of the subroutine stack 110 established while new stack frames are pushed onto the subroutine stack 110, it is also possible to keep record of the different status of protection of the subroutine stack 110, directly in the subroutine stack 110, while the subroutine stack 110 is unstacked. Then, when the subroutine stack 110 is unstacked after the termination of execution of a subroutine, the proper return address to the calling software program (i.e. main software program 300 or others subroutines) along with the previous status of protection of the subroutine stack 110 (i.e. the previous state of the first and second hardware-protected regions R1 and R2) may be restored altogether. Hence as the subroutine stack 110 dynamically grows or shrinks, the first and second hardware-protected regions R1, R2 are dynamically adjusted. This solution is achieved by using from two to four address registers 212, 213, 214, 215 wherein the first address register 212 may simply be a constant since its value does not change throughout the overall solution of the subject application once it is defined for the first time apart for at least one exception as already explained and which can be easily handled. The implementation of the proposed solution can be eased by closely following the stack pointer SP while it is updated (i.e. incremented and decremented). The subject application thus enables several subroutines executing code having different security levels to be collocated within the same subroutine stack 110. Therefore, with the proposed solution it is not necessary, for example, to use different subroutine stacks for nested subroutines. The proposed solution does not introduce any overhead to the main software program 300 or subroutines since all the information necessary for the protection of the subroutine stack 110 is obtained by the hardware. Indeed, only the compiler used to compile the main program 300 need be adapted to take into consideration the proposed protection scheme of the subroutine stack 110. Therefore, all existing software programs may benefit from the advantage of the proposed solution without needing any modifications. Additionally, contrary to other solutions there is no need to adjust the stack pointer SP when exiting a subroutine.

The above description elaborates embodiments of the present application with regard to a stack having an overflow boundary located at the lowest address and the underflow boundary located as the highest address. However, those skilled in the art will understand on the basis of the teaching of the present application that a stack having an overflow boundary located at the highest address and the underflow boundary located as the lowest address may likewise be applicable in conjunction with the present application. In order to adapt the above teaching to the latter stack memory organization, a highest address should be replaces with a lowest address and vice versa.

Of course, the above advantages are exemplary, and these or other advantages may be achieved by the proposed solution. Further, the skilled person will appreciate that not all advantages stated above are necessarily achieved by embodiments described herein.

The proposed solution may also be implemented in a computer program product stored in a non-transitory computer-readable storage medium that stores computer-executable code which causes a processor computer to perform the operation of the subroutine stack protection unit 210 and/or the exemplary method as illustrated in FIG. 4, for instance.

A processor comprising the subroutine stack protection unit 210 of the subject application is also claimed.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. For example, the user alert device and the driver alert may be combined in a single module. Also, one or more sensors may be combined in a single module.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an", as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A stack protection unit for preventing unauthorized access to at least part of a memory stack, the memory stack having memory addresses extending between a top address and a bottom address, the memory stack being accessible by a processor for storing and removing at least one stack frame, the processor controllable by one main software program, the stack protection unit comprising:

a first and a second address register, each adapted to store an address of the stack;

a third and a fourth address register, each adapted to store an address of the stack; and the processor, wherein the processor is coupled to the first and second address registers, wherein, when the execution of the main software program is suspended by the processor due to the execution of a first subroutine of the main software program, the processor is configured to:

set at least one access rule based on at least the first and second address registers, preventing the ongoing subroutine from accessing at least a first hardware-protected region of the memory stack, the first hardware-protected region comprising at least one stack frame associated with a return address from which the main software program resumes execution after termination of the execution of the first subroutine;

store onto the memory stack, a second stack frame comprising content of the second address register;

store in the first address register, a bottom address associated with the second stack frame;

store in the second address register, a top address associated with a third stack frame stored onto the memory stack by the main software program, the third stack frame comprising a return address from which the main software program resumes execution after termination of the execution of the first subroutine;

set a first access rule preventing the first subroutine from accessing the first hardware-protected region of the memory stack, the first hardware-protected region extending between the address of the memory stack stored in the first address register and the address of the memory stack stored in the second address register; and wherein, when the execution of the first subroutine is suspended due to execution of at least one nested subroutine, the processor is further configured to store in the first address register a bottom address of the memory stack and to, until the nested subroutines have terminated execution, recursively:

store onto the memory stack, a fourth stack frame comprising content of the second address register;

store in the fourth address register, content of the second address register;

store in the third address register, a bottom address associated with the fourth stack frame;

store in the second address register, a top address associated with a fifth stack frame stored onto the memory stack by the first subroutine or a nested subroutine, the fifth stack frame comprising a return address from which the first subroutine or a nested subroutine resumes execution after termination of the execution of an ongoing subroutine; and set a second access rule preventing the ongoing subroutine from accessing the first hardware-protected region of the memory stack, the first hardware-protected region extending between the address of the memory stack stored in the second address register and the address of the memory stack stored in the third address register, and a second hardware-protected region of the memory stack, the second hardware-protected region extending between the address of the memory stack stored in the first address register and the address of the memory stack stored in the fourth address register.

2. The stack protection unit of claim 1, wherein, when executing the main software program:

the processor is configured to store in:

the first address register, the bottom address of the memory stack;

the second address register, the bottom address of the memory stack or a null address.

3. The stack protection unit of claim 1, wherein the first hardware-protected region of the memory stack extends between the address of the memory stack stored in the second address register and a predetermined higher address relative to the address of the memory stack stored in the second address register.

4. The stack protection unit of claim 1, wherein, when the execution of the first subroutine is terminated:

the processor is further adapted to store in the second address register content of the second stack frame.

5. The stack protection unit of claim 1, wherein, when the execution of the ongoing subroutine is terminated:
the processor is further adapted to:
store in the second address register, content of a latest stored stack frame selected between the third stack frame and the fourth stack frame;
store in the third address register, a bottom address associated with a latest stored stack frame selected between the second stack frame and the fourth stack frame;
store in the fourth address register, one address selected between:
a top address associated with a latest stored stack frame selected between the third stack frame and the fifth stack frame; and
the bottom address of the memory stack.

6. A method of preventing unauthorized access to at least part of a memory stack, the memory stack having memory addresses extending between a top address and a bottom address, the memory stack being accessible by a processor for storing and removing at least one stack frame, the method comprising:
providing a first, a second, a third and a fourth address register, each adapted to store a respective address of the memory stack, wherein the processor is coupled to the first and second registers;
when the execution of the main software program is suspended by the CPU due to the execution of a first subroutine of the main software program,
causing the processing unit processor to:
set at least one access rule based on at least the first and second address registers, preventing
the first subroutine from accessing at least a first hardware-protected region of the memory stack, the first hardware-protected region comprising at least one stack frame associated with a return address from which the main software program resumes execution after termination of the execution of the first subroutine;
store onto the memory stack, a second stack frame comprising content of the second address register;
store in the first address register, a bottom address associated with the second stack frame;
store in the second address register, a top address associated with a third stack frame stored onto the memory stack by the main software program, the third stack frame comprising a return address from which the main software program resumes execution after termination of the execution of the first subroutine; and,
set at least one access rule preventing the first subroutine from accessing the first hardware-protected region of the memory stack, the first hardware-protected region extending between an address of the memory stack stored in the first address register and an address of the memory stack stored in the second address register; and
when execution of the first subroutine is suspended due to execution of at least one nested subroutine, causing the processor to further store in the first address register the bottom address of the memory stack and to, until the nested subroutines have terminated execution, recursively:
store onto the memory stack, a fourth stack frame comprising content of the second address register;
store in the fourth address register, content of the second address register;
store in the third address register, a bottom address associated with the fourth stack frame;
store in the second address register, a top address associated with a fifth stack frame stored onto the memory stack by the first subroutine or a nested subroutine, the fifth stack frame comprising a return address from which the first subroutine or a nested subroutine resumes execution after termination of the execution of an ongoing subroutine; and
set at least one access rule preventing the ongoing subroutine from accessing the first hardware-protected region of the memory stack, the first hardware-protected region extending between an address of the memory stack stored in the second address register and an address of the memory stack stored in the third address register, and a second hardware-protected region of the memory stack, the second hardware-protected region extending between an address of the memory stack stored in the first address register and an address of the memory stack stored in the fourth address register.

7. The method of claim 6, further comprising during the execution of the main software program:
storing the bottom address of the stack in the first address register; and
storing the bottom address of the stack or a null address in the second address register.

8. The method of claim 6 wherein the first hardware-protected region of the memory stack extends between an address of the memory stack stored in the second address register and a predetermined higher address relative to the address of the memory stack stored in the second address register.

9. The method of claim 6, further comprising, when the execution of the first subroutine is terminated, storing content of the second stack frame
in the second address register.

10. The method of claim 6, further comprising, when the execution of the ongoing subroutine is terminated:
storing in the second address register, a bottom address associated with a latest stored stack frame selected between the third stack frame and the fourth stack frame;
storing in the third address register, content of the latest stored stack frame selected between the second stack frame and the fourth stack frame;
storing in the fourth address register, one address selected between:
a top address associated with the latest stored stack frame selected between the third stack frame and the fifth stack frame; and
the bottom address of the memory stack.

* * * * *